United States Patent
Ogura

[11] Patent Number: 6,145,044
[45] Date of Patent: Nov. 7, 2000

[54] PCI BUS BRIDGE WITH TRANSACTION FORWARDING CONTROLLER FOR AVOIDING DATA TRANSFER ERRORS

[75] Inventor: Shiro Ogura, Tokyo, Japan

[73] Assignee: Mitsubishi Denki Kabushiki Kaisha, Tokyo, Japan

[21] Appl. No.: 09/161,274

[22] Filed: Sep. 28, 1998

[30] Foreign Application Priority Data

Mar. 19, 1998 [JP] Japan .................................. 10-069589

[51] Int. Cl.⁷ ............................ G06F 12/38; G06F 12/40
[52] U.S. Cl. ................................ 710/126; 710/8; 710/52;
710/100; 710/101; 710/107; 710/108; 710/110;
710/113; 710/128; 710/129; 710/130; 713/400;
713/401; 714/2; 714/44; 714/56; 714/57
[58] Field of Search ........................... 710/126, 128,
710/129, 8, 52, 100, 101, 107, 108, 110,
113, 130; 713/400, 401; 714/2, 44, 56,
57

[56] References Cited

U.S. PATENT DOCUMENTS

| | | | |
|---|---|---|---|
| 5,555,383 | 9/1996 | Elazar et al. | 710/126 |
| 5,768,602 | 6/1998 | Dhuey | 713/322 |
| 5,864,653 | 1/1999 | Tavallaei et al. | 714/2 |
| 5,878,238 | 3/1999 | Gan et al. | 710/128 |
| 5,887,194 | 3/1999 | Carson et al. | 710/36 |
| 5,983,306 | 11/1999 | Corrigan et al. | 710/129 |

FOREIGN PATENT DOCUMENTS

| | | |
|---|---|---|
| 57-197629 | 12/1982 | Japan . |
| 351943 | 3/1991 | Japan . |
| 5197669 | 8/1993 | Japan . |
| 6013116 | 4/1994 | Japan . |
| 6149730 | 5/1994 | Japan . |
| 8339345 | 12/1996 | Japan . |
| 981505 | 3/1997 | Japan . |
| 10307788 | 11/1998 | Japan . |

OTHER PUBLICATIONS

"PCI Local bus Specification",Revision 2.1, 3.3.3.3. –3. 4 pp.49–55.

"PCI to PCI Bridge Architecture Specification", Revision 1.0, April 5, 1994, pp. 1–55.

Primary Examiner—Ayaz R. Sheikh
Assistant Examiner—Frantz Blanchard Jean
Attorney, Agent, or Firm—Leydig, Voit & Mayer

[57] ABSTRACT

A bus bridge which can prevent invalid data from being transferred from a secondary PCI bus to a primary PCI bus even when an SCSI controller or another device provided with a memory the content of which is cleared after a read, is connected to the secondary PCI bus. In a controller, a transaction is processed as a delayed transaction. A combination circuit generates a switching logic signal in accordance with a command or an address included in the transaction. In accordance with the memory content, a bus release controller restricts transmission by a transaction forward controller of a control signal for stopping the transaction issued on the primary PCI bus. Instead of restricting the transmission of the control signal, the time-out period of the buffer memory may be prolonged.

22 Claims, 7 Drawing Sheets

PCI BUS BRIDGE WITH TRANSACTION FORWARDING CONTROLLER FOR AVOIDING DATA TRANSFER ERRORS

BACKGROUND OF THE INVENTION

(1) Field of the Invention

The present invention relates to a bus bridge, and more particularly, it relates to an error avoiding technique in a bus bridge in which, for example, a delayed transaction is used.

(2) Description of the Related Art

In a computer system, available as one of broadly accepted local buses for connecting various input/output devices is a PCI (peripheral component interconnect) bus. Specifications of the PCI bus are described in PCI Local Bus Specification issued by PCISIC (Special Interest Group), which disclosure is hereby incorporated by reference. Because of the presence of the electrical restrictions in the PCI bus, only about four to five devices can be connected to one bus in an actual system. On the other hand, a small-sized computer (so-called personal computer) having the PCI bus is beyond personal use and increasingly applied to a large-sized system. Accordingly, there have arisen demands for the mounting of multiple SCSI (small computer systems interface) cards, network cards or the like for connecting a disc device. For example, a PCI-to-PCI bridge meets such a demand.

According to the PCI-to-PCI bridge, the originally existing PCI bus (hereinafter referred to as "the primary PCI bus") is expanded. Thereby, an electrically separated PCI bus of one lower class (hereinafter referred to as "the secondary PCI bus") can be obtained. Specifications of a conventional PCI-to-PCI bridge are described in PCI-to-PCI Bridge Architecture Specification issued by said PCISIG, which disclosure is hereby incorporated by reference.

FIG. 4 is a block diagram showing an example of a computer system in which the PCI-to-PCI bridge is used. In a computer system 1 shown in FIG. 4, a CPU 2 is connected via a CPU bus 3 to a host bridge 5 and a main memory 4 including a memory controller and a memory. The host bridge 5 functions as one bus master of a primary PCI bus 6. Other bus masters such as an ISA/EISA bridge 7, an SCSI controller 8, a network controller 9 and a PCI-to-PCI bridge 10 are connected to the primary PCI bus 6. To expand the primary PCI bus 6, a secondary PCI bus 11 providing four slots is further connected to the PCI-to-PCI bridge 10. To two of the slots there are connected an SCSI controller 13, to which a disc memory 12 is connected, and an SCSI controller 15, to which a tape device 14 is connected. Specifically, in the computer system 1 shown in FIG. 4, by connecting the secondary PCI bus 11 via the PCI-to-PCI bridge 10 to one slot of the primary PCI bus 6, the primary PCI bus 6 is expanded and the number of devices connectable to the entire system is increased.

Next, the operation of the above-mentioned conventional PCI-to-PCI bridge 10 will be described. There are two types of forwarding (system of transferring a bus transaction from an initiator bus to a target bus) of a bus transaction by the PCI-to-PCI bridge 10. In one system, as shown in a timing chart of FIG. 5, the initiator bus is occupied until the transaction of the target bus is completed. This is herein referred to as the non-delayed transaction. In the other system, as shown in a timing chart of FIG. 6, after a transaction is issued on the target bus, the initiator bus is temporarily opened. This is referred to as the delayed transaction. The delayed transaction is a function added from Revision 2.1 of said PCI Local Bus Specification, which disclosure is hereby incorporated by reference. An object of the function is to raise the bus operation efficiency and enhance the system performance.

Here, the non-delayed transaction and the delayed transaction will be described in more detail. FIG. 5 is a timing chart showing an example of an operation in which the non-delayed transaction is used and the CPU of FIG. 4 reads data of one word from a register of the SCSI controller 13. In this case, the host bridge 5 as the bus master first issues an IO read transaction 16 on the primary PCI bus 6. The PCI-to-PCI bridge 10 receives the IO read transaction 16 to perform a predetermined address conversion and so on. The corresponding IO read transaction 17 is issued on the secondary PCI bus 11 three clocks behind the rising of the IO read transaction 16. Then, target data is read from the register in the SCSI controller 13 at the timing of a final clock of the IO read transaction 17. The read data is temporarily stored in a buffer memory in the PCI-to-PCI bridge 10. Thereafter, two clocks later, the data is transmitted onto the primary PCI bus 6.

As seen from FIG. 5, in the non-delayed transaction, the primary PCI bus 6 is occupied by the IO read transaction for a period of eleven clocks. During this period, the other PCI devices cannot operate. Therefore, the PCI bus cannot be operated efficiently.

Next, an example of the operation of the computer system 1 in which the delayed transaction is used for processing the transaction in the PCI-to-PCI bridge 10 will be described. FIG. 6 is a timing chart showing an example of operation in which the CPU 2 of FIG. 4 reads the data of one word from the register in the SCSI controller 13. Here, an IO read transaction 18 issued on the primary PCI bus 6 is transferred via the PCI-to-PCI bridge 10 to the secondary PCI bus 11. At this time, the PCI-to-PCI bridge 10 transmits a control signal to the primary PCI bus 6 to release the primary PCI bus 6 before the target data is transferred to the primary PCI bus 6. On the other hand, on the secondary PCI bus 11, an IO read transaction 19 is issued and the register is read similar to in FIG. 5. The read target data is then stored in the buffer memory in the PCI-to-PCI bridge 10. Thereafter, an IO read transaction 20 is reissued on the primary PCI bus 6 for the same address. At this time, if there is data in the buffer memory, the data is transmitted to the primary PCI bus 6 at the third clock after the rising of the IO read transaction 20. The transaction is then completely ended.

In the delayed transaction shown in FIG. 6, for one IO read transaction, the primary PCI bus 6 is occupied for a period of six (=3+3) clocks. On the other hand, in the non-delayed transaction shown in FIG. 5, the period is eleven clocks. In this case, in the PCI-to-PCI bridge 10, by using the delayed transaction, the bus operation efficiency can be enhanced.

However, when the delayed transaction is used for processing the transaction in the PCI-to-PCI bridge 10, one problem occurs. FIG. 7 is a timing chart showing a defect occurring in the PCI-to-PCI bridge 10 in which the delayed transaction is used. In the computer system 1 shown in FIG. 4, the SCSI controller 13 reads a series of data from the disc memory 12, and finishes transferring the data to the primary PCI bus 6 as the host bus. An interrupt signal indicative of the completion of transfer is then transmitted toward the primary PCI bus 6. Subsequently, the CPU 2 responds to the interrupt signal, reissues an IO read transaction on the primary PCI bus 6 and reads a status register in the SCSI controller.

That is to say, the SCSI controller or the like is provided with the status register. When an interrupt signal is transmitted to the primary PCI bus 6, information indicating that interrupt occurs and information indicating whether or not data transfer is normally completed are stored in the status register. In many SCSI controllers, the content of the status register is cleared at the time of reading. This is done in an attempt to reduce the number of necessary processes for the SCSI controller.

FIG. 7 shows the defect accompanying the operation. The defect will be described with reference to the timing chart of FIG. 7. First, when an interrupt signal 23 is transmitted from the SCSI controller 13 to the secondary PCI bus 11, the interrupt signal 23 is read by CPU 2. The CPU 2 initiates a process for reading target data from the status register of the SCSI controller 13. First, an IO read transaction 21 is issued on the primary PCI bus 6. The transaction is processed by the PCI-to-PCI bridge 10 in the manner of a delayed transaction. If no data is stored in the buffer memory disposed in the PCI-to-PCI bridge 10, an IO read transaction 22 is issued on the secondary PCI bus 11. The valid data 23 is read from the status register. The read valid data 23 is held in the buffer memory of the PCI-to-PCI bridge 10 as valid read data 24. On the other hand, the content of the status register is cleared at the time it is read out as aforementioned, and changed into invalid data.

Furthermore, the read data 24 in the buffer memory of the PCI-to-PCI bridge 10 is not held permanently. If the read data 24 is not read from the primary PCI until after a predetermined time-out period $T_{max}$ elapses, it is discarded. It is described in said PCI Local Bus Specification Revision 2.1 that the time-out period $T_{max}$ corresponds to $2^{15}$ clocks at maximum. The time-out occurs when the computer system 1 frequently accesses other devices or continuously performs a network process to delay the timing at which the IO read transaction is reissued, or in some other cases.

After the data has been discarded because of the time-out, an IO read transaction 25 is reissued on the primary PCI bus 6. In this case, since no data resides in the buffer memory, the PCI-to-PCI bridge 10 again issues an IO read transaction 26 on the secondary PCI bus 11. Data is read again from the status register of the SCSI controller 13. However, at this time, the content of the status register of the SCSI controller 13 is already cleared and turned into the invalid data (refer to an arrow A). Therefore, invalid read data 27 is stored in the buffer memory of the PCI-to-PCI bridge. Thereafter, the invalid read data 27 is transmitted to the primary PCI bus 6 after an IO read transaction 28 which is issued on the primary PCI bus 6. The invalid data is decoded by the CPU 2. However, since the invalid data is different from an expected value, an error is caused in the CPU 2.

As aforementioned, when the computer system 1 is constructed by using the PCI-to-PCI bridge 10 in which the delayed transaction is used according to PCI Local Bus Specification Revision 2.1, data cannot be read normally from the device connected to the secondary PCI bus 11 in some cases. As a result, the reliability of the system is disadvantageously lowered.

SUMMARY OF THE INVENTION

An object of the invention is to provide a bus bridge which prevents a primary bus from being occupied unnecessarily and prevents invalid data from being transferred from a secondary bus to a primary bus even when an SCSI controller or another device provided with a memory whose content is cleared after reading is connected to the secondary bus.

In the present invention, when a transaction is processed by the transaction forward controller, it is judged in accordance with transaction content as to whether or not another transaction process is necessary for avoiding errors or the like. When the process is judged necessary, the transmission of a control signal, which is for releasing the first bus, to the first bus is restricted. In this manner, the transaction is not discontinued on the first bus, and the bus is not released. Another transaction can be prevented from interrupting. The data of target address can be securely transferred in response to a specific transaction. As a result, while the unnecessary occupation of the primary bus is avoided, the invalid data can be prevented from being transferred from the secondary bus to the primary bus even when the secondary bus is connected to a device provided with a memory like a status register of an SCSI whose content is cleared after reading.

In the invention, when a transaction is processed by the forward controller, it is judged in accordance with transaction content as to whether or not another transaction process is necessary. When the process is judged necessary, a time-out period is prolonged. In this manner, necessary data can be prevented from disappearing from a buffer memory. As a result, even when a device provided with a memory like a status register of the SCSI controller whose content is cleared after reading is connected to the secondary bus, the unnecessary occupation of the primary bus is avoided while the invalid data can be prevented from being transferred from the secondary bus to the primary bus.

In another aspect of the invention, when it is judged that another transaction process is necessary, the time-out period is prolonged to an infinite length. In this manner, the target data can further be securely transferred to the primary bus. The reliability of the system can thus be enhanced.

In another aspect of the invention, it is judged in accordance with the type of command included in the transaction as to whether or not an error avoiding process is necessary. In this case, when the transaction includes the command in which another transaction process is generally regarded as necessary, the transaction can be processed in another transaction process.

In another aspect of the invention, information for specifying a command is stored beforehand. Based on this command and a command included in the transaction received from an initiator, it is judged whether or not another transaction process is necessary. In this case, by pre-storing the command in which another transaction process is generally regarded as necessary, the necessity of another transaction process can be judged more precisely.

In another aspect of the invention, it is judged in accordance with an address included in a transaction as to whether or not another transaction process is necessary. In this case, when the specific address of the device in which another transaction process is generally regarded as necessary is included in the transaction, by judging that another transaction process is necessary, the transaction can be subjected to a proper transaction process.

Additionally, in another aspect of the invention, the information for specifying an address is stored beforehand. Based on this address and an address included in the transaction received from the initiator, it is judged whether or not an error avoiding process is necessary. In this case, by pre-storing the address of the device in which another transaction process is generally regarded as necessary, the necessity of another transaction process can be judged more precisely.

In another aspect of the invention, in response to a control input from the outside, the necessity of another transaction process is judged. In this manner, the necessity of another transaction process can be judged easily and flexibly.

In another aspect of the invention, by pre-storing data indicating whether or not another transaction process is necessary, the necessity of another transaction process is judged based on the data. In this case, when the device in which another transaction process is generally regarded as necessary is connected or in other cases, by pre-storing data indicating that another transaction process is necessary, another transaction process can be securely performed.

In another aspect of the invention, data stored in the buffer memory is compared with the existing data of the address from which the data stored in the buffer memory was read, before the buffer memory is cleared. When both the data do not match, it is judged that another transaction process is necessary. In this manner, the data which seems difficult to obtain again can be prevented from being carelessly deleted from the buffer memory and failing to be transmitted to the initiator. The reliability of the system can be enhanced.

In another aspect of the invention, there is further provided means for forwarding a transaction issued on a second bus to a first bus. In this manner, a device on the first bus can access a device on the second bus. Conversely, the device on the second bus can access the device on the first bus.

DETAILED DESCRIPTION OF THE PREFERRED EMBODIMENTS

Embodiment 1

Figure 1:
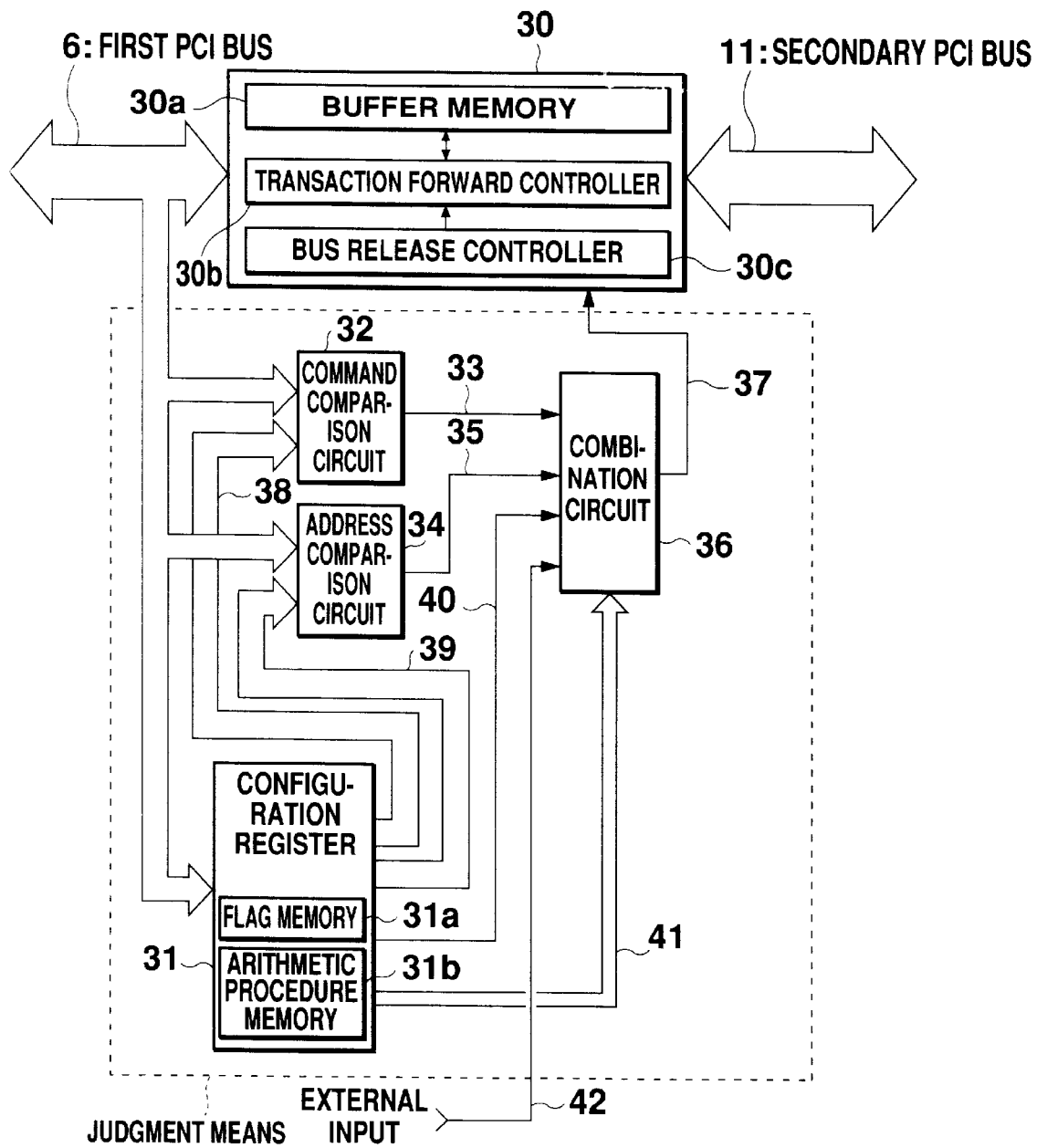
FIG. 1 is a block diagram showing a PCI-to-PCI bridge according to Embodiment 1 of the invention.
Figure 4:
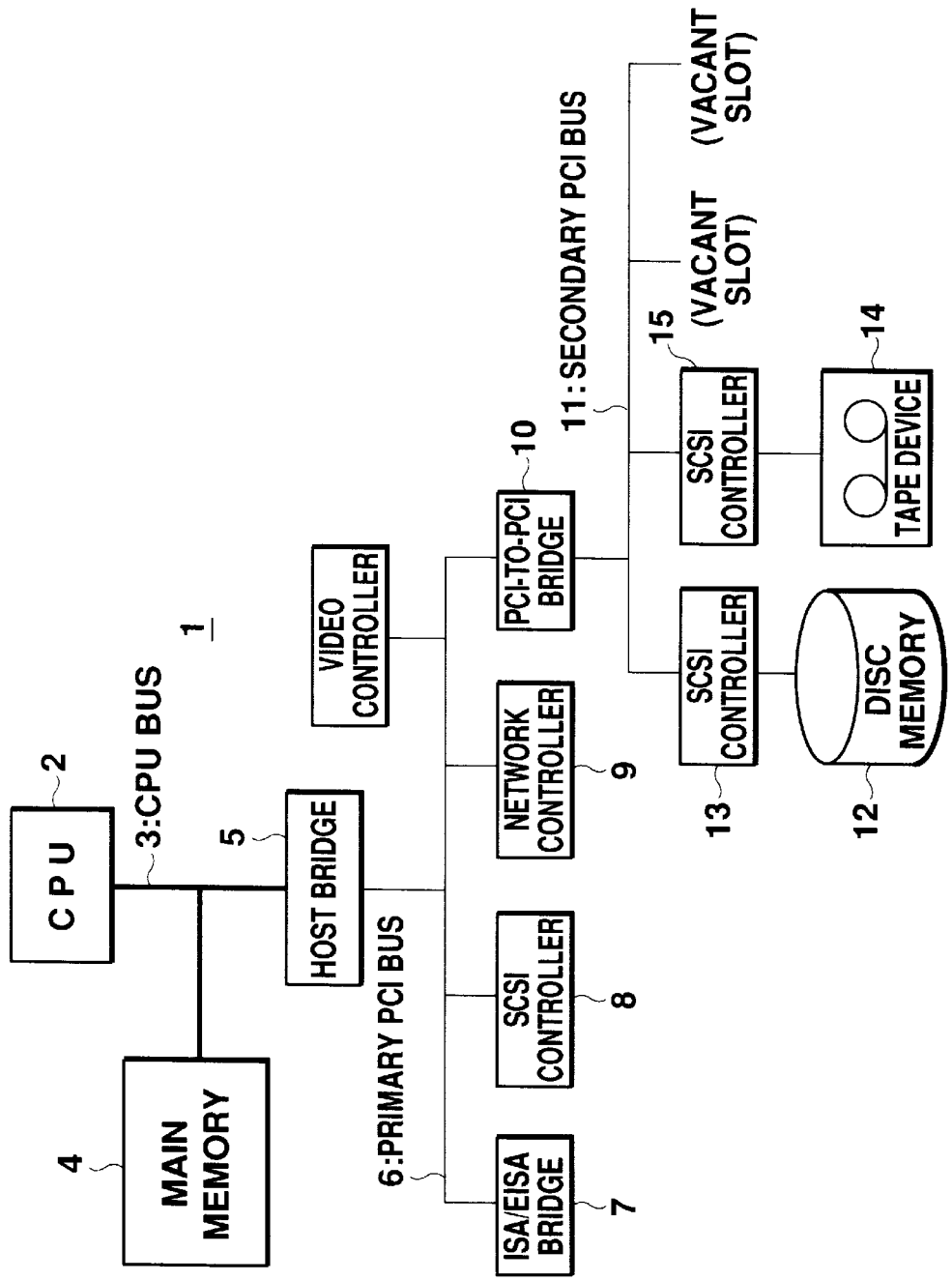
FIG. 4 is a block diagram showing a computer system including the PCI-to-PCI bridge.
Figure 5:
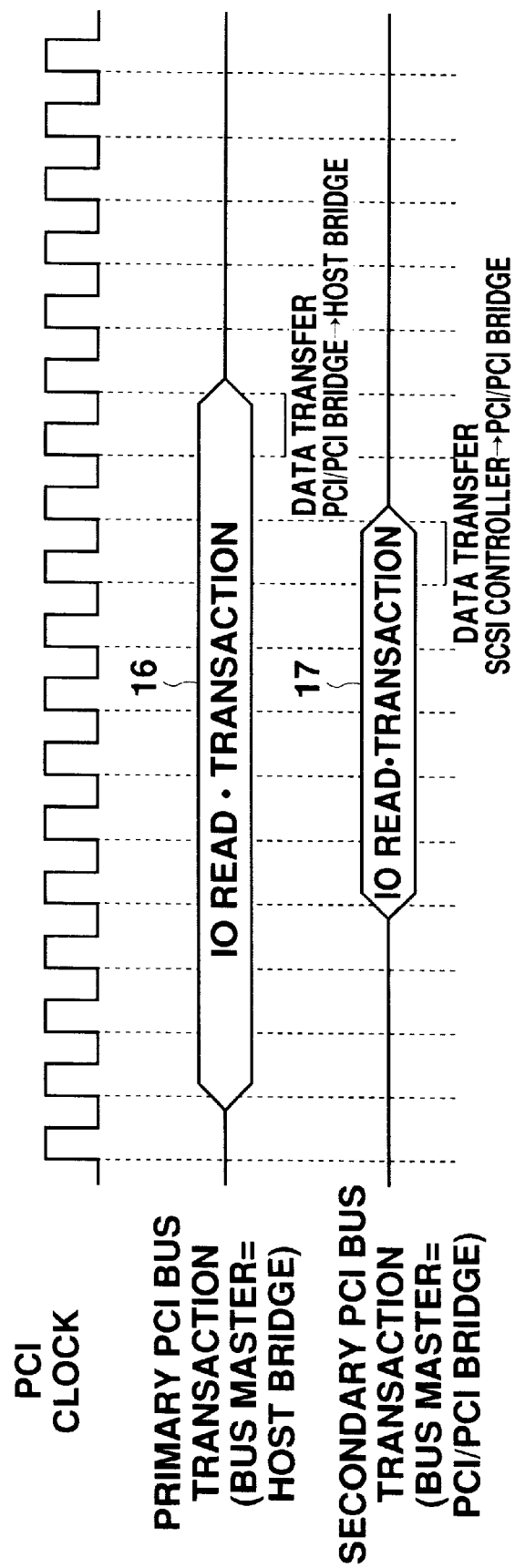
FIG. 5 is a timing chart showing a non-delayed transaction.
Figure 6:
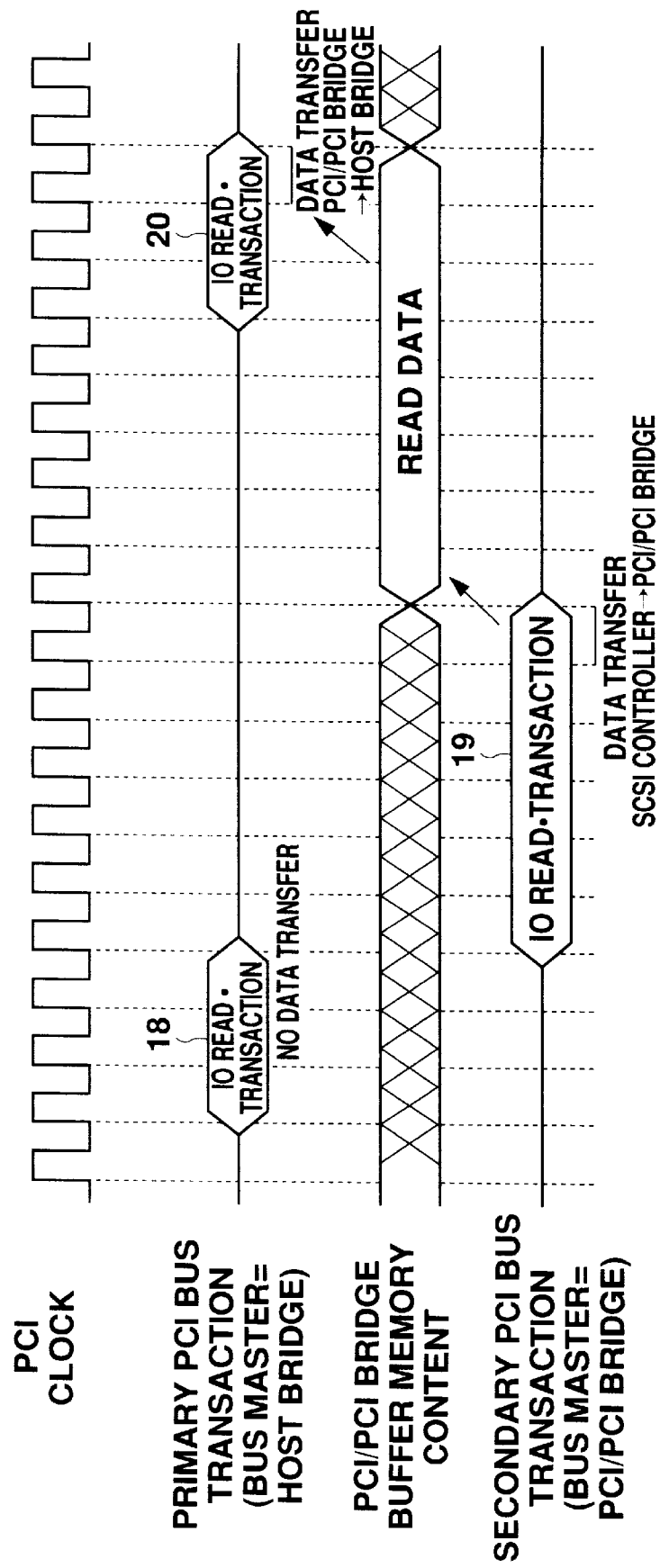
FIG. 6 is a timing chart showing a delayed transaction.

FIG. 1 is a block diagram showing a PCI-to-PCI bridge 10a according to Embodiment 1 of the invention. The PCI-to-PCI bridge 10a shown in FIG. 1 is a replacement of the PCI-to-PCI bridge 10 in the computer system 1 of FIG. 4. Since portions other than the portions relating to the invention are known to a person skilled in the art, the description thereof is omitted here.

In FIG. 1, numeral 30 denotes a controller; 31 a configuration register; 32 a command comparison circuit; 33 a command comparison result output; 34 an address comparison circuit; 35 an address comparison result output; 36 a combination circuit; 37 a switching logic signal; 38 a command data; 39 an address data; 40 a flag value signal; 41 data from an arithmetic procedure memory; and 42 an external input signal.

The controller 30 further comprises a buffer memory 30a, a transaction forward controller 30b and a bus release controller 30c. The buffer memory 30a can store an address, a command and a control signal which are included in a transaction latched from a primary PCI bus 6 and a secondary PCI bus 11. Moreover, the controller 30 is constituted in such a manner that a transaction can be processed in both a delayed transaction and a non-delayed transaction. The switching logic signal 37 indicates which system, delayed or non-delayed, the transaction is to be processed in. Specifically, the switching logic signal 37 is transmitted to the bus release restriction section 30c. When the content of the switching logic signal 37 is "enable", the bus release restriction section 30c instructs the transaction forward controller 30b to process the transaction in the delayed transaction. When the content of the switching logic signal 37 is "disable", the bus release restriction section 30c instructs the transaction forward controller 30b to process the transaction in the non-delayed transaction. Specifically, in the operation of the delayed transaction, when an IO read command is transmitted to the primary PCI bus 6, the transaction forward controller 30b transmits a control signal to the primary PCI bus 6, thereby requesting to stopping of the transaction and opening of the primary PCI bus 6. When the content of the switching logic signal 37 is "disable", the operation mode is changed to restrict the transmission of the control signal and process the transaction in the non-delayed transaction. On the other hand, in the conventional PCI-to-PCI bridge 10, the block corresponding to the transaction forward controller 30b processes the transaction only in the non-delayed transaction or only in the delayed transaction.

In the command comparison circuit 32, the command to be forwarded is latched every time. It is indicated by the output of the command comparison result signal 33 whether or not the latched command coincides with either of commands set in the configuration register 31. Specifically, various types of commands are set in the configuration register 31. The data indicative of the plural commands are transmitted to the command comparison circuit 32 via the command data 38 with a width of one bit or more. Then, the command comparison circuit 32 emits the command comparison result signal 33 which indicates whether or not the command latched from the primary PCI bus 6 coincides with any of the commands represented by the command data 38.

Similar to the command comparison circuit 32, the address comparison circuit 34 latches the address to be forwarded every time. It is indicated by the output of the address comparison result signal 35 whether or not the latched address coincides with any of addresses set in the configuration register 31. Various types of addresses are further set in the configuration register 31. The data indicative of the plural addresses are transmitted to the address comparison circuit 34 via the address data 39 with a width of one bit or more. The address comparison circuit 34 then emits the address comparison result signal 35 which indicates whether or not the address latched from the primary PCI bus 6 coincides with either of the addresses represented by the address data 39.

As aforementioned, plural commands and addresses are set in the configuration register 31. They are transmitted as the command data 38 and the address data 39 to the command comparison circuit 32 and the address comparison circuit 34, respectively. Additionally, the configuration register 31 includes a flag memory 31a. The content is transmitted via the flag value signal 40 to the combination circuit 36. Furthermore, the configuration register 31 includes an arithmetic procedure memory 31b which stores arithmetic procedure data indicative of the arithmetic procedure of the combination circuit 36. The content is transmitted via the data path 41 to the combination circuit 36. Specifically, a user can indicate which combination logic arithmetic operation is to be performed by the combination circuit 36 by setting data in the arithmetic procedure memory 31b of the configuration register 31. The set data is transmitted to the combination circuit 36 via the data path 41 having a width of one bit or more. Additionally, the configuration register 31 for storing the data indicative of the combination logic is constituted of a register of a portion (address) which can be used for performing settings inherent to the device. The same can be applied to other cases.

To the combination circuit 36, there are transmitted the command comparison result signal 33 as an output of the command address comparison circuit 32, the address comparison result signal 35 as another output of the address comparison circuit 32, the flag value signal 40 as one of outputs of the configuration register 31 and the external input signal 42 as objects of the arithmetic operation. By using one or more of these signals and combining logical sums and products and inversion, the arithmetic operation is performed to generate the switching logic signal 37. The procedure and method of the logic arithmetic operation are determined by the arithmetic procedure indicating data 41 which is emitted from the configuration register 31 as aforementioned.

Additionally, when generating the switching logic signal 37, the combination circuit 36 refers to the content of the external input signal 42. By means of the external input to a pin of an IC constituting the PCI-to-PCI bridge 10, the user can directly designate the transaction process of the transaction forward controller 30b. Furthermore, when generating the switching logic signal 37, the combination circuit 36 also refers to the content of the flag memory 31a. Therefore, by setting a desired flag value in the flag memory, the user can also designate the transaction process procedure of the transaction forward controller 30b in advance.

Next, a concrete example of operation of the PCI-to-PCI bridge 10a will be described. Here, the same instance as the instance used in the description of the errors in the prior-art PCI-to-PCI bridge 10 will be used to describe the operational example of the PCI-to-PCI bridge 10a.

In the prior-art PCI-to-PCI bridge 10, when the status register included in the SCSI controller 13 is read from the side of the primary PCI bus 6, errors occur. In this case, by means of the following settings to avoid such errors, the PCI-to-PCI bridge 10a of the embodiment may be used. Specifically, by setting "IO read command" in the configuration register 31, the content is transmitted via the command data 38 to the command comparison circuit 32. Additionally, by setting the address of the status register of the SCSI controller 13 in the configuration register 31, the content is transmitted via the address data 39 to the address comparison circuit 34. Furthermore, in the arithmetic procedure given to the combination circuit 36, it is indicated that the transaction including both the command and the address is not subjected to the process of the delayed transaction. The procedure is set beforehand in the arithmetic procedure memory 31b of the configuration register 31, and transmitted via the arithmetic procedure indicating data 41 to the combination circuit 36. In this setting, the use of the non-delayed transaction is minimized. Therefore, without deteriorating the effect of the delayed transaction (enhancement of bus operation efficiency), a highly reliable computer system 1 can be constructed.

By setting the flag memory 31a of the configuration register 31, the transaction forwarding is directly set as follows. For example, first, when the SCSI controller 13 or another device provided with a register having a condition that changes when read is not connected to the secondary PCI bus 11, "enable" is set in the flag memory 31a in such a manner that the transaction is processed in the delayed transaction. On the other hand, when such a device is connected, "disable" is set in the flag memory 31a in such a manner that the transaction is processed as a non-delayed transaction. In this case, the content of the arithmetic procedure memory 31b may be stored beforehand in the configuration register 31 in such a manner that the switching logic signal 37 is generated by referring only to the content of the flag memory 31a. In this manner, in accordance with the type of the device connected to the secondary PCI bus 11, the system for processing the transaction can be selected beforehand.

Moreover, in a system using the PCI-to-PCI bridge 10a, reliability is sometimes given high priority, and the demand for performance is relatively moderate. In this case, "disable" may be set in the flag memory 31a to process a transaction in the non-delayed transaction. Therefore, by processing a transaction as a non-delayed transaction, a sufficient reliability can be secured.

The way of directly setting the transaction process system via the external input signal 42 is the same as the way of setting the flag memory 31a of the configuration register 31. Specifically, when the device provided with a register having a condition that changes when read is connected to the secondary PCI bus 11, the external input signal 42 indicative of "enable" is transmitted to the combination circuit 36 to process the transaction as a delayed transaction. When such a device is not connected, the external input signal 42 indicative of "disable" may be transmitted to the combination circuit 36 to process the transaction as a non-delayed transaction. Additionally, when reliability is given high priority and the demand for performance is relatively moderate in a system using the PCI-to-PCI bridge 10a, then the external input signal 42 indicative of "disable" may be transmitted to the combination circuit 36 to process a transaction as a non-delayed transaction. In the direct setting via the external input signal 42, no software change is necessary. The invention can be instantly applied to an existing system.

Additionally, the PCI-to-PCI bridge 10a of the embodiment can be variously modified. For example, in FIG. 1 and the description thereof, a transaction is forwarded from the primary PCI bus 6 toward the secondary PCI bus 11. Furthermore, when the transaction is forwarded from the secondary PCI bus 11 to the primary PCI bus 6, the transaction may be processed in the same structure. Moreover, the transaction may be processed bidirectionally between the primary PCI bus 6 and the secondary PCI bus 11.

Figure 2:
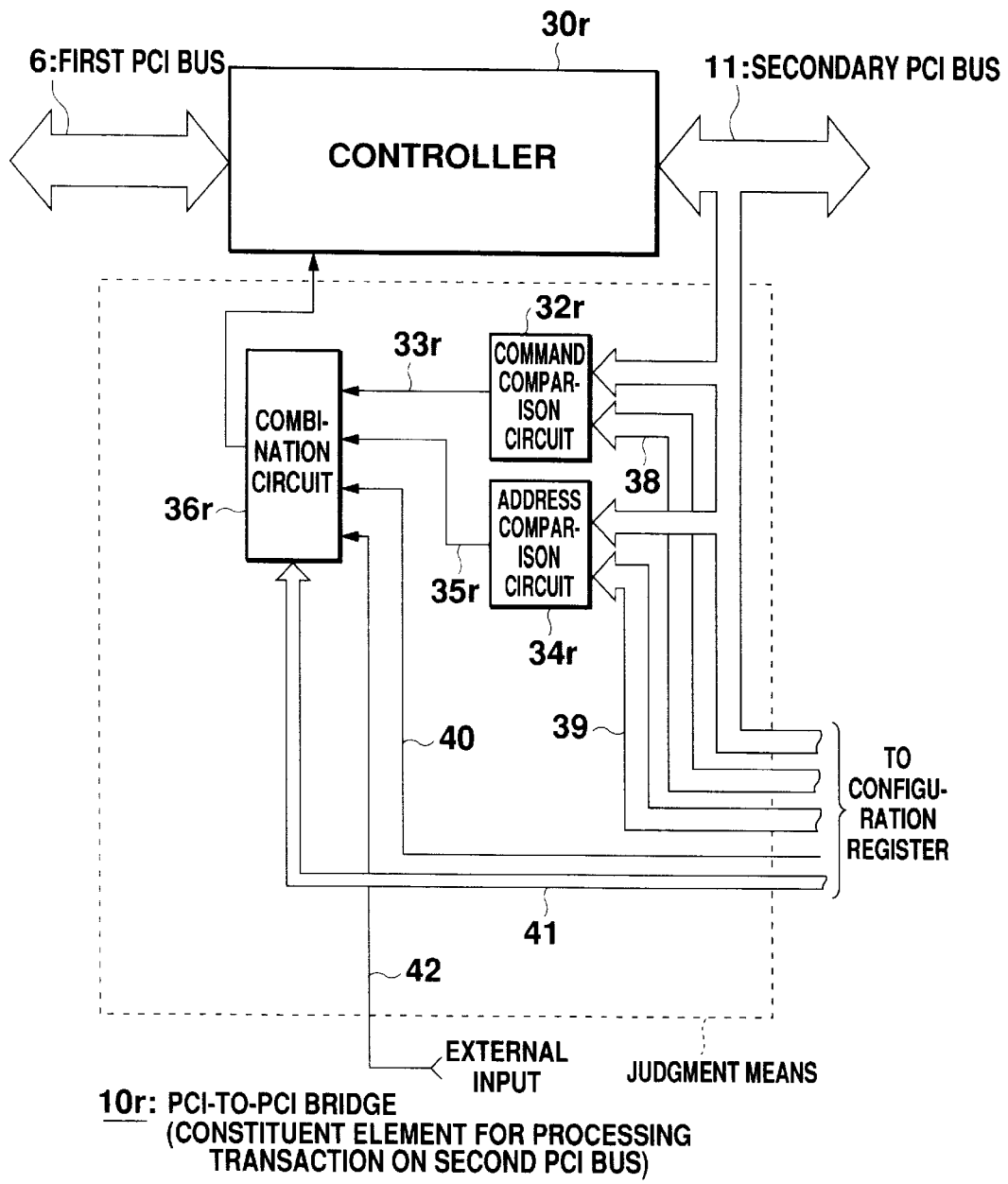
FIG. 2 is a block diagram showing an additional portion of the PCI-to-PCI bridge according to Embodiment 1.

FIG. 2 is a block diagram showing a constitution to be added to the PCI-to-PCI bridge 10a shown in FIG. 1 when the transaction is bidirectionally processed. In a PCI-to-PCI bridge 10r as the additional structure shown in FIG. 2, a controller 30r, a command comparison circuit 32r, an address comparison circuit 34r and a combination circuit 36r are equivalent to the controller 30, the command comparison circuit 32, the address comparison circuit 34 and the combination circuit 36 shown in FIG. 1. Furthermore, in the additional constitution shown in FIG. 2, the configuration register 31 shown in FIG. 1 is shared. Specifically, output signals of the configuration register 31 are transmitted to the command comparison circuit 32r, the address comparison circuit 34r and the combination circuit 36r similar to the constituent elements shown in FIG. 1. Needless to say, for the process of the transaction on the secondary PCI bus 11, a configuration register may be prepared separately from the process of the transaction of the primary PCI bus 6.

Embodiment 2

Next, a PCI-to-PCI bridge according to Embodiment 2 of the invention will be described. In the prior-art PCI-to-PCI bridge 10, as aforementioned, the data held in the buffer memory is cleared after the time-out period elapses. However, in the PCI-to-PCI bridge of this embodiment, when the read data is held in the buffer memory, the time-out period is especially prolonged under predetermined conditions.

According to the PCI Local Bus Specification Revision 2.1, the time-out period is set within $2^{15}$ clocks. In some actual PCI-to-PCI bridge products, the time-out period can be set in two stages: $2^{15}$ and $2^{10}$. However, there is no product in which the time-out period can be set longer than $2^{15}$ clocks. In the PCI-to-PCI bridge of the invention, the time-out period can be set in three or more stages including a time longer than $2^{15}$ clocks. Furthermore, the time-out period can be set to an infinite length. Specifically, the PCI-to-PCI bridge can be set without any time-out. To set the time-out period, the time-out period may be directly set in the configuration register of the PCI-to-PCI bridge 10a, or indirectly set. Specifically, the user may select the time-out period from predetermined values.

According to the PCI-to-PCI bridge of this embodiment, by simply adding a slight modification to the prior-art PCI-to-PCI bridge, the previously occurring error can be avoided. Additionally, in an actual system, the setting of the time-out period may be determined by taking account of a system constitution and application or another actual operation.

As aforementioned, the prolonged time-out period is set in a fixed manner. Besides, the time-out period may be prolonged especially when the transaction needs to be processed in a system other than the delayed transaction. Specifically, when the retention time of the target data in the buffer memory 30a reaches $T_{max}$ and the content needs to be cleared, then by referring to the content stored in the configuration register, transaction content or the external input signal, the time-out period may be appropriately prolonged.

Figure 3:
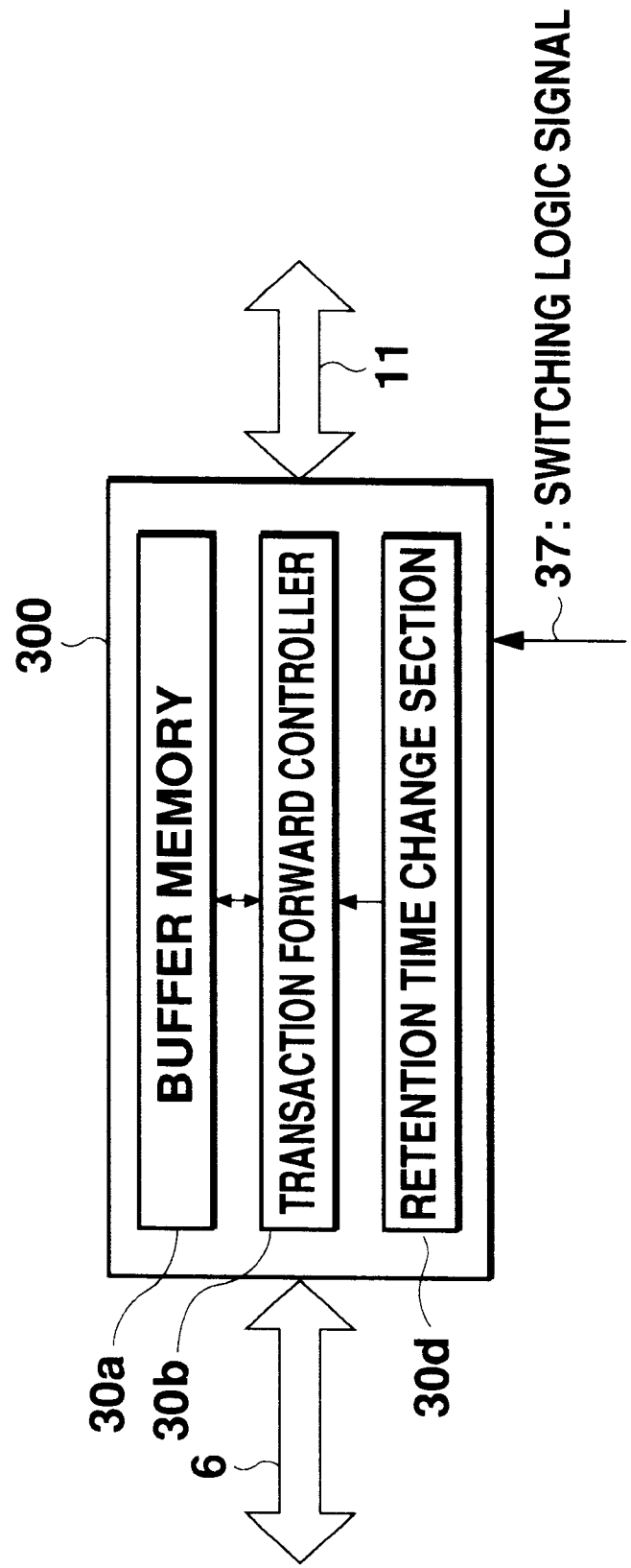
FIG. 3 is a block diagram showing a controller of a PCI-to-PCI bridge according to Embodiment 2 of the invention.

FIG. 3 is a block diagram showing a constitution of a controller included in the PCI-to-PCI bridge according to this modification. A controller 300 shown in FIG. 3 includes a buffer memory 30a, a transaction forward controller 30b and a retention time change section 30d. The buffer memory 30a and the transaction forward controller 30b are constituted similar to the PCI-to-PCI bridge 10a of Embodiment 1. To the retention time change section 30d a switching logic signal 37, similar to the switching logic signal 37 in the PCI-to-PCI bridge 10a of Embodiment 1, is transmitted. When the switching logic signal 37 indicates "disable", the transaction forward controller 30b is instructed to prolong the time-out period.

According to this structure, the time-out period can be prolonged as required. Therefore, the buffer memory 30a can be effectively used. Additionally, the data read from the status register of the SCSI controller or another memory whose content is cleared when read can be sufficiently prevented from being carelessly deleted from the buffer memory 30a.

Embodiment 3

Next, a PCI-to-PCI bridge according to Embodiment 3 of the invention will be described. Different from the prior-art PCI-to-PCI bridge 10, in the PCI-to-PCI bridge of this embodiment, the original data on the secondary PCI bus is accessed again before the content of the buffer memory is cleared when the time-out period elapses. By detecting whether or not the data has changed, it is judged whether or not the content of the buffer memory is to be continuously held.

Figure 7:
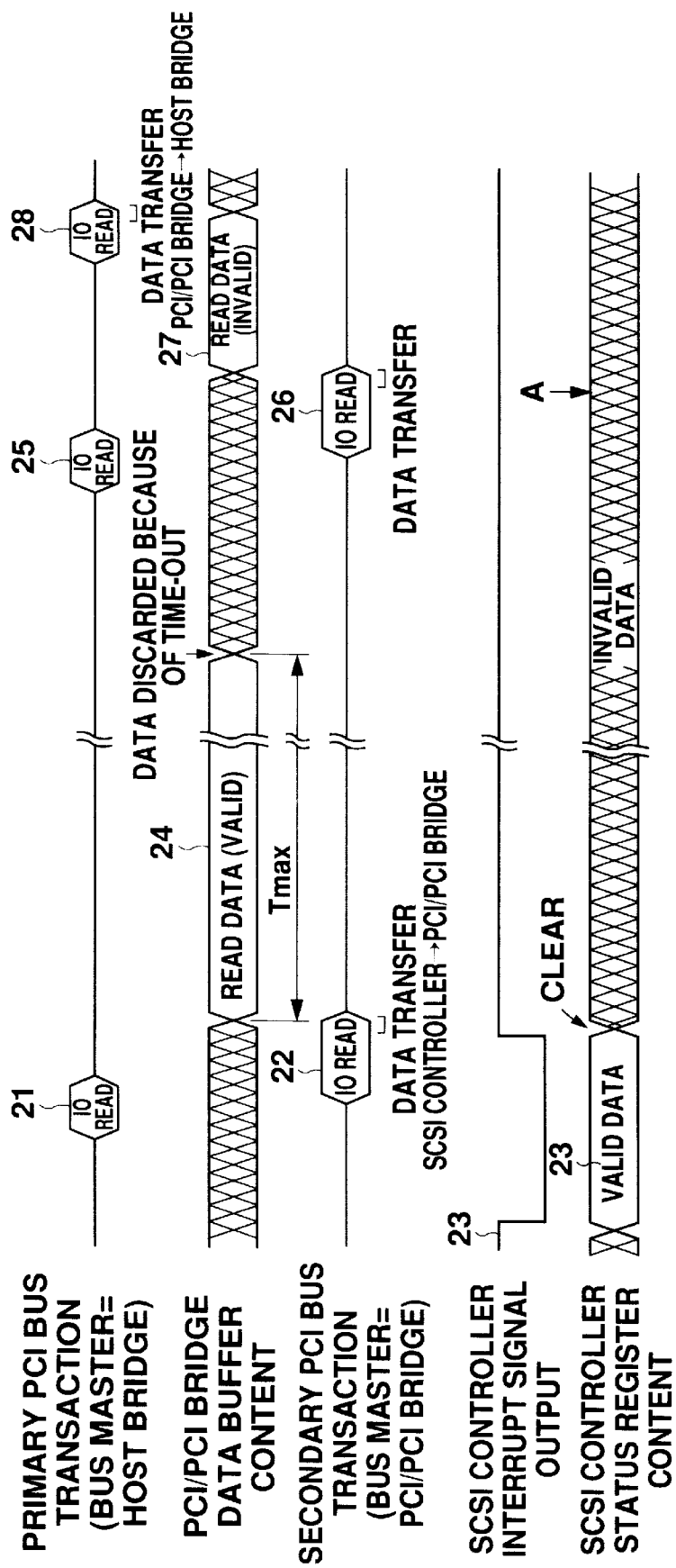
FIG. 7 is a timing chart showing a defect occurring in a conventional PCI-to-PCI bridge in which the delayed transaction is used.

On the premise that the controller 300 of the PCI-to-PCI bridge regarding Embodiment 2 exists, Embodiment 3 will be described. In the prior-art PCI-to-PCI bridge 10, the initial process of the IO read transaction is completed on the secondary PCI bus 11 and the read data is stored in the buffer memory. Thereafter, when the time $T_{max}$ elapses and no IO read transaction has been re-issued on the primary PCI bus 6, the read data is discarded unconditionally (refer to FIG. 7). However, in the PCI-to-PCI bridge of Embodiment 3, when the time $T_{max}$ elapses, the same IO read transaction is reissued on the secondary PCI bus 11. Then, the register of the target address is read. When the read data coincides with the read data stored from the buffer memory 30a, the read data in the buffer memory 30a is discarded. On the other hand, when the data do not coincide with each other, it is judged that the memory of the relevant target address has had its content cleared when read and the same content is difficult to obtain again. Therefore, the switching logic signal 37 indicative of "disable" is transmitted to the controller 300 of Embodiment 2. The retention time change section 30d of the controller 300 may hold the data permanently until the data is read via the transaction from the primary PCI bus 6. Alternatively, after a predetermined time elapses, the register of the target address is again read and the aforementioned process may be performed.

According to this embodiment, when the data stored in the buffer memory 30a is to be discarded because the time $T_{max}$ has elapsed, it is examined whether or not the content of the data in the target address has actually changed compared with the first accessed data. Even after the data is discarded, it can be judged whether or not the correct data can be obtained again. As a result, when the data is to be discarded, it is judged that the correct data cannot be obtained again. The time-out period is then prolonged and the data is held. Thereby, the correct data can be securely transmitted to the bus on the side of the initiator. Moreover, since the process can be performed by the PCI-to-PCI bridge, the setting of the configuration register or another software change does not need to be performed.

In this embodiment, at the time of the time-out of the buffer memory 30a, it is judged whether or not the time-out period is to be prolonged. However, after the data has been read from the device connected to the secondary PCI bus 11, the judgment process may be performed at any time before the read data of the buffer memory 30a is cleared.

Furthermore, in the aforementioned embodiments, especially the instance for avoiding the accompanying defect when data is read from the status register of the SCSI controller 13 has been described. Even if the status register is a memory such as RAM or the like, an error may occur in the same manner when the content is cleared after reading. The PCI-to-PCI bridge according to the embodiments can effectively over come the defect.

As aforementioned, the examples of the method of judging the necessity of a non-delayed transaction process in the system delayed transaction, include 1) the method of judging the necessity based on the content of the transaction (including the command and the address), 2) the method of judging the necessity by referring to the external input signal, 3) the method of judging the necessity by referring to the preset value (flag value) and 4) the method of judging the necessity based on the identity of the stored data by accessing the same target address plural times. Moreover, the aforementioned actual error avoiding processes include A) the process of changing the transaction process system from the delayed transaction to the non-delayed transaction and B) the process of prolonging the time-out period of the buffer memory 30a. By optionally combining 1) to 4) and A) and B) in the PCI-to-PCI bridge, the defect which has occurred in the prior-art PCI-to-PCI bridge 10 can be avoided. While avoiding the unnecessary occupation of the primary bus, invalid data can be prevented from being transferred from the secondary bus to the primary bus even when the SCSI controller or another device provided with a memory whose content is cleared after being read is connected to the secondary bus.

What is claimed is:

1. A bus bridge controlling communication between a first bus and a second bus, the bus bridge comprising:
    a buffer memory;
    a transaction forward controller controlling a first transaction forward process for, when a first transaction including an address of a target device connected to the second bus is issued on the first bus,
        a) transmitting correspondingly stored data to the first bus when the address is stored in said buffer memory, and
        b) issuing a second transaction, corresponding to the first transaction, on the second bus, transmitting a control signal to the first bus to release the first bus, and receiving target data from the target device and holding the target data in said buffer memory for a time-out period if the address of the target device has not been stored in said buffer memory;
    judgment means for determining whether a second transaction forward process is necessary to avoid errors in the target data transferred to the first bus; and
    bus release restriction means for restricting transmission of the control signal for releasing the first bus, to the first bus by said transaction forward controller, when said judgment means determines that a second transaction forward process is necessary.

2. The bus bridge according to claim 1 wherein said judgment means determines whether a second transaction forward process is necessary based on a command included in the first transaction.

3. The bus bridge according to claim 2 wherein said judgment means further includes a command specifying information memory for storing information for specifying the command and determines whether a second transaction forward process is necessary based on the command specified by the information stored in said command specifying information memory and the command included in the first transaction.

4. The bus bridge according to claim 1 wherein said judgment means determines whether a second transaction forward process is necessary based on an address included in the first transaction.

5. The bus bridge according to claim 4 wherein said judgment means further includes an address specifying information memory for storing information for specifying the address and determines whether a second transaction forward process is necessary based on the address specified by the information stored in said address specifying information memory and the address included in the first transaction.

6. The bus bridge according to claim 1 wherein said judgment means determines whether a second transaction forward process is necessary based on an external control unit.

7. The bus bridge according to claim 1 wherein said judgment means further includes a flag memory and determines whether a second transaction forward process is necessary based on a flag stored in said flag memory.

8. The bus bridge according to claim 1 further including:
    a second transaction forward controller controlling a third transaction forward process for, when a third transaction including an address of a second target device connected to the first bus is issued on the second bus,
        a) transmitting correspondingly stored data to the second bus when the address is stored in said buffer memory, and
        b) issuing a fourth transaction, corresponding to the third transaction, on the first bus, transmitting a control signal to the second bus to release the second bus, and receiving second target data from the second target device and holding the second target data in said buffer memory for a time-out period if the address of the second target device has not been stored in said buffer memory;
    second judgment means for determining whether a fourth transaction forward process is necessary, based on content of the third transaction, to avoid errors in the second target data transferred to the second bus; and
    second bus release restriction means for restricting transmission of the control signal for releasing the second bus, to the second bus, when said second judgment means determines that a fourth transaction forward process is necessary.

9. The bus bridge according to claim 1 further including:
    a second transaction forward controller controlling a third transaction forward process for, when a third transaction including an address of a second target device connected to the first bus is issued on the second bus,
        a) transmitting correspondingly stored data to the second bus when the address is stored in said buffer memory, and
        b) issuing a third transaction, corresponding to the second transaction, on the first bus, transmitting a control signal to the second bus to release the second bus, and receiving second target data from the second target device and holding the second target data in said buffer memory for a time-out period if the address of the second target device has not been stored in said buffer memory;
    second judgment means for determining whether a fourth transaction forward process is necessary, based on content of the second transaction, to avoid errors in the second target data transferred to the second bus; and
    retention time change means for prolonging the time-out period when said second judgment means determines that a fourth transaction forward process is necessary.

10. A bus bridge controlling communication between a first bus and a second bus, the bus bridge comprising:
    a buffer memory;
    a transaction forward controller controlling a first transaction forward process for, when a first transaction including an address of a target device connected to the second bus is issued on the first bus,
        a) transmitting correspondingly stored data to the first bus when the address is stored in said buffer memory, and
        b) issuing a second transaction, corresponding to the first transaction, on the second bus, transmitting a control signal to the first bus to release the first bus, and receiving target data from the target device and holding the target data in said buffer memory only for a time-out period if the address of the target device has not been stored in said buffer memory;

judgment means for determining whether a second transaction forward process is necessary to avoid errors in the target data transferred to the first bus; and retention time change means for prolonging the time-out period when said judgment means determines that a second transaction forward process is necessary.

11. The bus bridge according to claim 10 wherein when said judgment means determines that a second transaction forward process is necessary, said retention time change means prolongs the time-out period to an infinite length.

12. The bus bridge according to claim 10 wherein when said judgment means determines whether a second transaction forward process is necessary based on a command included in the first transaction.

13. The bus bridge according to claim 12 wherein said judgment means further includes a command specifying information memory for storing information for specifying the command and determines whether a second transaction forward process is necessary based on the command specified by the information stored in said command specifying information memory and the command included in the first transaction.

14. The bus bridge according to claim 10 wherein said judgment means determines whether a second transaction forward process is necessary based on an address included in the first transaction.

15. The bus bridge according to claim 14 wherein said judgment means further includes an address specifying information memory for storing information for specifying the address and determines whether a second transaction forward process is necessary based on the address specified by the information stored in said address specifying information memory and the address included in the first transaction.

16. The bus bridge according to claim 10 wherein said judgment means determines whether a second transaction forward process is necessary based on an external control unit.

17. The bus bridge according to claim 10 wherein said judgment means compares the target data held in said buffer memory and original data stored in the target device connected to the second bus before the target data is deleted from said buffer memory and determines that a second transaction forward process is necessary when the data is not the same.

18. The bus bridge according to claim 10 wherein said judgment means further includes a flag memory and determines whether a second transaction forward process is necessary based on a flag stored in said flag memory.

19. The bus bridge according to claim 10 further including:

a second transaction forward controller controlling a third transaction forward process, when a third transaction including an address of a second target device connected to the first bus is issued on the second bus, a) transmitting correspondingly stored data to the second bus when the address is stored in said buffer memory, and b) issuing a third transaction, corresponding to the second transaction, on the first bus, transmitting a control signal to the second bus to release the second bus, and receiving second target data from the second target device and holding the second target data in said buffer memory for a time-out period if the address of the second target device has not been stored in said buffer memory;

second judgment means for determining whether a fourth transaction forward process is necessary, based on content of the second transaction, to avoid errors in the second target data transferred to the second bus; and bus release restriction means for restricting transmission of the control signal for releasing the second bus, to the second bus, when said second judgment means determines that a fourth transaction forward process is necessary.

20. The bus bridge according to claim 10 further including:

a second transaction forward controller controlling a third transaction forward process for, when a third transaction including an address of a second target device connected to the first bus is issued on the second bus, a) transmitting correspondingly stored data to the second bus when the address is stored in said buffer memory, and b) issuing a third transaction, corresponding to the second transactions, on the first bus, transmitting a control signal to the second bus to release the second bus, and receiving second target data from the second target device and holding the second target data in said buffer memory for a time-out period if the address of the second target device has not been stored in said buffer memory;

second judgment means for determining whether a fourth transaction forward process is necessary, based on content of the second transaction, to avoid errors in the second target data transferred to the second bus; and second retention time change means for prolonging the time-out period when said second judgment means determines that a fourth transaction forward process is necessary.

21. A transaction forward method in a bridge bus in communication with a first bus and a second bus, the bridge bus including a buffer memory, the method comprising, in a first transaction forward process:

when a first transaction including an address of a target device connected to the second bus is issued on the first bus, a) transmitting correspondingly stored data to the second bus when the address is stored in said buffer memory, and b) issuing a second transaction, corresponding to the first transaction, on the second bus, transmitting a control signal to the first bus to release the first bus, and receiving target data from the target device and holding the target data in said buffer memory for a time-out period if the address of the target device has not been stored in said buffer memory;

determining whether a second transaction forward process is necessary to avoid errors in the target data transferred to the first bus; and restricting transmission of the control signal, releasing the first bus, to the first bus upon determination that a second transaction forward process is necessary.

22. A transaction forward method in a bridge bus in communication with a first bus and a second bus, the bridge bus including a buffer memory, the method comprising, in a first forward transaction process:

when a first transaction including an address of a target device connected to the second bus is issued on the first bus,
- a) transmitting correspondingly stored data to the first bus when the address is stored in said buffer memory, and
- b) issuing a second transaction, corresponding to the first transaction, on the second bus, transmitting a control signal to the first bus to release the first bus, and receiving target data from the target device and holding the target data in said buffer memory only for a time-out period if the address of the target device has not been stored in said buffer memory;

determining whether a second transaction forward process is necessary to avoid errors in the target data transferred to the first bus; and prolonging the time-out period upon determination that a second transaction forward process is necessary.

* * * * *